United States Patent [19]

Criswell

[11] Patent Number: 4,924,467
[45] Date of Patent: May 8, 1990

[54] SYSTEM FOR CHECKING DUPLICATE LOGIC USING COMPLEMENTARY RESIDUE CODES TO ACHIEVE HIGH ERROR COVERAGE WITH A MINIMUM OF INTERFACE SIGNALS

[75] Inventor: Peter B. Criswell, Bethel, Minn.

[73] Assignee: Unisys Corporation, Blue Bell, Pa.

[21] Appl. No.: 235,425

[22] Filed: Aug. 24, 1988

[51] Int. Cl.$^5$ .................. G06F 7/72; G06F 11/00
[52] U.S. Cl. ..................... 371/68.1; 371/54; 371/27; 364/739; 364/740
[58] Field of Search ............ 371/27, 54, 16.1, 16.5, 371/25.1, 21.1, 21.5, 67.1, 68.1, 68.3; 364/737, 738, 739, 740, 741

[56] References Cited

U.S. PATENT DOCUMENTS

| | | | |
|---|---|---|---|
| 3,660,646 | 5/1972 | Minero | 364/740 |
| 3,873,820 | 3/1975 | Parr | 364/739 |
| 4,181,969 | 1/1980 | Smith | 364/739 |
| 4,213,188 | 7/1980 | Smolko | 364/739 |
| 4,233,682 | 2/1979 | Liebergot et al. | 371/68.1 |
| 4,236,446 | 12/3198 | Lovrich | 371/54 |
| 4,265,173 | 5/1981 | Takahashi | 371/54 |
| 4,471,484 | 5/1982 | Sedmak | 371/27 |
| 4,691,319 | 9/1987 | Bose | 371/54 |
| 4,752,904 | 6/1988 | Paul | 364/739 |

Primary Examiner—Michael R. Fleming
Attorney, Agent, or Firm—Thomas J. Nikolai; Glenn W. Bowen; Robert S. Bramson

[57] ABSTRACT

A system for detecting and isolating fault conditions occurring within a digital electronic system. The digital electronic system includes a first digital logic array for generating digital outputs in response to a set of digital signal inputs applied to it. The digital logic array is replicated and the second array is configured to receive the same inputs as the first. The first and second arrays are made to operate in synchrony so as to normally produce identical outputs in the absence of fault conditions occurring either in the first or second array or in the inputs applied to them. The digital outputs from the first array are applied to first and second residue code generators having different modulii. Likewise, the outputs from the second arry are applied to third and fourth residue code generators which are identical in make-up to the first and second residue code generators. The residue codes developed by the first and third generators are applied to a first comparator while the codes developed by the second and fourth generators are applied to a second comparator. The comparator outputs are applied through combinatorial logic so as to provide an output signal indicative of a fault condition when either the first or second comparator produces an output indicative of inequality between respective residue codes.

3 Claims, 2 Drawing Sheets

SYSTEM FOR CHECKING DUPLICATE LOGIC USING COMPLEMENTARY RESIDUE CODES TO ACHIEVE HIGH ERROR COVERAGE WITH A MINIMUM OF INTERFACE SIGNALS

BACKGROUND OF THE INVENTION

1. Field of the Invention

This invention relates generally to a method and apparatus for detecting the occurrence of errors in digital computing systems and more particularly to a system in which arithmetic operations are carried out simultaneously in two identical hardware modules with the results (with a large number of signals) being compared and using complementary residue codes to minimize the number of interface signals required.

2. Discussion of the Prior Art

With the ever increasing complexity of digital computing systems and the also increasing requirements for better system availability and lower mean time to repair, improved techniques for the detection and isolation of logical malfunctions or faults is essential. Although known software techniques have been successfully employed to provide a measure of fault detection and isolation, they suffer from two major drawbacks. The first is that the software program performing the fault detection may not detect the fault before the error has propagated to the point where critical data has been corrupted, thus making the process of recovery very difficult or, in some cases, impossible. The second drawback is that while software techniques can provide an indication that an error has occurred, they are generally ineffective in sufficiently localizing the fault so that a rapid maintenance measure, i.e., the substitution of a good circuit card or module for the failed unit, can be expeditiously accomplished.

A more optimum solution to the detection and isolation of faults is to employ dedicated hardware fault-detection circuits which are capable of detecting and trapping a fault at or very near the instant in which it occurs. By doing this, not only is the corruption of data prevented, but also the machine state at the instant of the fault can be examined to aid in the diagnosis and isolation of the fault. Ideally, such fault detection hardware should add a minimum of additional circuitry to perform this function and at the same time should provide the highest possible probability of both fault detection and fault isolation.

A well-known technique which is effective for checking much of the logic employed in the digital computer is the use of parity. When a data word or operand is generated, its corresponding parity is generated and that parity passes, along with the data, through the various modules comprising the digital computer. At each juncture, the parity is again generated and compared to the parity transmitted. Thus, any single-bit error will result in a parity error and the precise location of that parity error will provide the required fault isolation. With more extensive fault detection logic, this approach can be extended to provide detection of multi-bit errors.

The simple technique of parity detection does not work, however, if parity is not preserved between the inputs and the outputs of a logical function. A prime example of this is the arithmetic logic unit (ALU) common to all digital computers which perform many functions, including some, such as logical operations, which do not lend themselves to coding techniques for checking, in which a data word (operand A) is combined with another data word (operand B) to provide the arithmetic result. There is no logical method to relate the parity of the arithmetic result with the parity of the two operand inputs, short of performing the same arithmetic operation. This suggests an approach for this class of logic in which an identical ALU is used to perform identical logical steps and the arithmetic results are compared at each step for equality. Other reasons for using duplicate checking are to achieve better error coverage than can be obtained using coding techniques and to enhance performance where code regeneration adds to data delay times. While the method of duplication comparison assures 100 percent detection of any single-point failure, it imposes an unacceptably high hardware overhead for the error detection logic in that a very large number of bits, in the range of 50 to 100, must be compared and for each comparison, an I/O pin must be provided on each of the arithmetic modules to allow the exchange of data for comparison purposes.

Residue coding is another technique which can be used to check computer operations. It has the advantage of working well to check arithmetic operations and its error detection coverage can be increased by choosing a larger modulus. In terms of a duplication/comparison checking utilization, both sets of bits to be compared can generate their corresponding residue codes, and only the residue codes need to be compared thus obtaining fairly high error coverage while requiring many fewer interface signals to be compared than the original set of bits. Dr. F. F. Paal describes a method by implementing residue code generators of modulus $2^{a-1}$ using a carry-save-adder tree and full adder. This method allows the building of such generators in a reasonable amount of logic and fast enough to be utilized in a comparison implementation. This technique will be described in further detail below.

The comparison of residue codes generated by two identical ALU's is effective in always detecting a single fault which results in a single erroneous output of the accumulator since, for this condition, the residue code generated will always be different from the residue code generated from the functional (non-error producing) arithmetic unit. Unfortunately, there is a very large class of faults which can occur that result in multiple output bits being in error. In this case, a malfunctioning ALU may generate the same residue code as the functional unit. In fact, the probability that this will happen for this class of faults is 1/m. The resulting dilemma is that if m is chosen to be small, the probability of fault detection is poor, and if m is chosen to be large, the overhead in terms of comparison logic and input/output pins may become too high.

Algirdas Avizienis also describe the use of residue codes in error checking logic. In the Jet Propulsion Laboratory Technical Report No. 32-711 titled "A Study of the Effectiveness of Fault-Detecting Codes for Binary Arithmetic", which he authored, a mathematical analysis shows that the use of multiple check factors (residue codes) improves the effectiveness of fault detection. The mathematical relationship described in this article is utilized in the present invention.

OBJECTS

It is an object of this invention to provide an improved means of performing error detection on arithmetic logic which employs the efficiency of residue number arithmetic, while providing a superior probability of fault detection.

Another principal object of the present invention is to provide a very high error detection coverage for a large number of signals to be checked while requiring a minimum number of signals to be passed between dual modules.

It is yet a further object of this invention to implement the aforementioned fault detection and isolation capability with a pair of identical arithmetic modules. This is an important consideration in that the number of module types employed to implement a computer system strongly affects the logistics cost, particularly in the cost of the spare parts inventory which must be maintained.

DESCRIPTION OF THE PREFERRED EMBODIMENT

Figure 1:
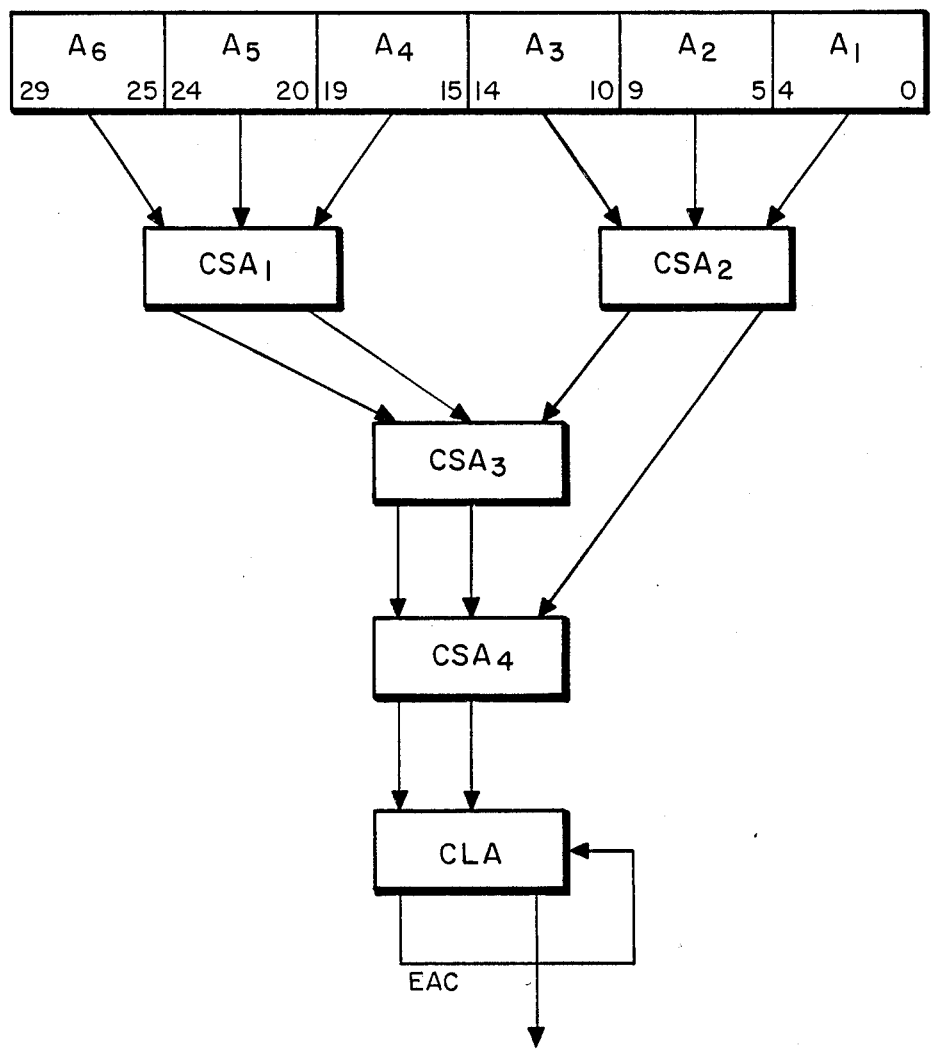
FIG. 1 is a copy of the prior art check symbol generator shown in the above-referenced Paal publication.

Referring to FIG. 1, there is illustrated FIG. 1 of the aforereferenced Paal application which shows the manner in which cascaded carry-save adders can be used to perform residue number arithmetic for error checking. For the example of FIG. 1, a modulo, m, of 31 is chosen. The data to be compressed is contained in a 30-bit accumulator register. The effect of the residue generator is to treat the accumulator input as a binary number, which is divided by the modulo, i.e., 31, and the output being the residue or remainder resulting from this division. Accumulator segments A6, A5 and A4 are presented as inputs to the 5-bit carry-save-adder 1. Similarly, accumulator segments A3, A2 and A1 are coupled to carry-save-adder 2. The property of the carry-save-adder is that addition proceeds as in a conventional binary adder except that when a carry is generated, the carry is discarded and, concurrently, a "1" is added in the leastsignificant bit position. This action is often referred to as an "end-around carry". The sum and carry outputs of carry-save-adder 1, along with the carry of carry-save-adder 2 are provided as inputs to carry-save-adder 3. The carry and sum of carry-saveadder 3, along with the sum of carry-save-adder 2, are presented as inputs to carry-save-adder 4. Finally, the sum and the carry of carry-save-adder 4 are provided as inputs to the carry look ahead (CLA) adder which adds these inputs to generate the residue number. This technique is extendable to any modulo, m, which satisfies the equation $m = 2^k - 1$ where k = the number of bits per segment.

Figure 2:
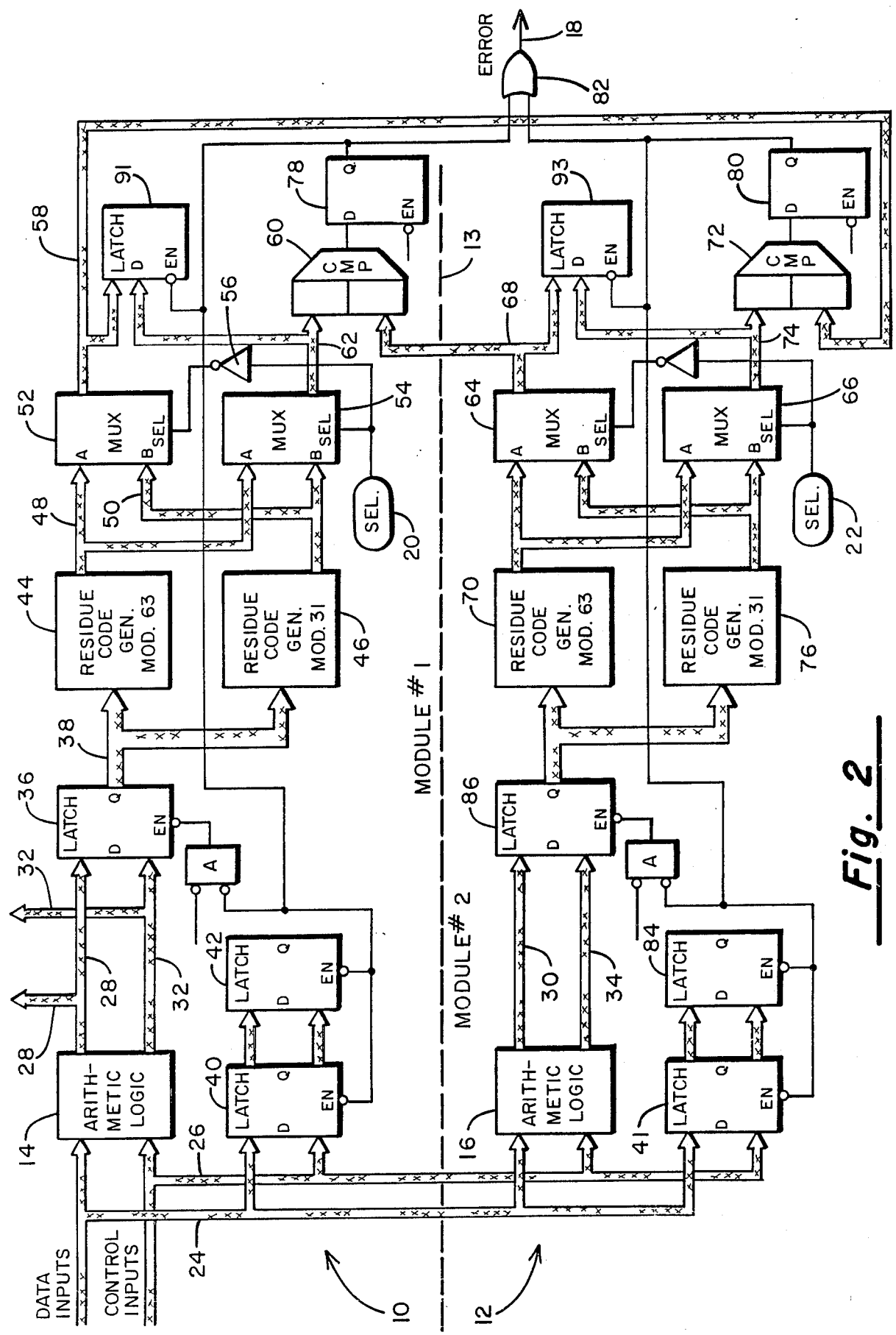
FIG. 2 is a block diagram illustrating the error detection apparatus in accordance with the present invention using comparison techniques and complementary residue codes.

FIG. 2 shows a block diagram of the preferred embodiment. It is comprised of two identical modules 10 and 12 referred to as the master module and slave module, respectively. They are shown as being separated by a dashed line 13. Each of the modules is representative of a portion of logic which would be considered as a field replaceable unit typically, a printed circuit board module. Arithmetic module #1, identified by numeral 10, contains the arithmetic logic 14 which is to be monitored to detect an error condition. Arithmetic module #2, identified by numeral 12, contains the identical arithmetic logic 16 which is operated in synchrony with the arithmetic logic 14 so that error checking comparisons can be performed. The remainder of the circuitry shown in FIG. 2 is used to provide the error condition indication on line 18 and also to provide circuitry useful in isolating the source of the error. Since identical circuitry is used for both modules #1 and #2, a means is required to designate their operational role. This is done by select lines 20 and 22. Select line 20 is hardwired to a logical "1" condition by means of a back plane interconnect, thereby designating the particular residue code generator 44–46 or 64–66 which is to be utilized in modules #1 and #2, respectively. By reversing the interconnect, the selection of code generators of each module can be reversed.

Timing of a digital computer system is typically accomplished with a multiphase clock where the leading edge of the phase 1 clock pulse defines the start of each machine cycle. For each machine cycle, data inputs 24 and control inputs 26 are presented to the arithmetic logic sections 14 and 16 and for each machine cycle arithmetic logic sections 14 and 16 provide a data output result on lines 28 and 30, respectively.

An example of typical data outputs would be the accumulator outputs of an ALU. However, arithmetic logic 14 is intended to be indicative of any arithmetic logic which should be error checked and which is not amenable to the simple form of parity checking because parity is not preserved as data passes through the logic. Such apparatus may also produce control outputs, indicated at control buses 32 and 34 for arithmetic logic 14 and 16, respectively.

An example of control outputs might be the "carry" or the "zero-detect" outputs for an ALU. However, it is intended to be representative of any outputs which might be formed in response to a combination of data and control inputs being applied to an arithmetic section. Outputs 32 and 28 are the active outputs which are used by the other portions of the computer system, while outputs 34 and 30 are only used for the error checking comparison to be described.

Control and data outputs are captured in a parallel latch or register 36. In some instances, register 36 is enabled every cycle but, where possible, these signals are captured in parallel latch 36 only when they contain data which is being used outside the arithmetic logic. For instance, the final output register will be gated only on the last cycle of an instruction. This is possible because the error detection coverage of the system described is so high. It is desirable to gate to parallel latch 36 only at these times so that when an error is detected at the error designators 78 and 80, they can lock up latches 36 and 80 at the same time as parallel latches 42 and 84.; Latches 36 and 80 will then contain the captured output signals which correspond to the captured input signals in latches 42 and 84. The input control and data signals will be captured in latches 40 and 41 at the same time of the instruction that they are captured in the functional arithmetic logic 14 and 16. This data will be advanced to parallel latches 42 and 84 at the end of the instruction such that the error designators 78 and 80 can lock up input signals in latches 42 and 84 corresponding to the output signals locked up in latches 36 and 86. The input signals captured may include information such as the instruction code and input operands for the instruction. Such information can be used to determine which module 14 or 16 failed.

For certain types of arithmetic logic, diagnosis can be simplified by performing the error checking comparison only on selected cycles. Consider, for example, the case of an arithmetic logic unit executing a divide instruction which is comprised of a sequence of cycles. In this situation, it is preferable to enable latches 36 and 86 only on the final cycle of the instruction since it is easier for the diagnostic software to compute what the final result should have been rather than any arbitrary intermediate result. In effect, residue comparison is suspended during the intervening cycles. Any error is nevertheless detected since it will propagate that error to the final result.

The most efficient code selection (highest coverage with least number of interface signals) is to choose the two complementary codes of the form $2^A - 1$ where if the first code is $2^m - 1$ and the second code is $2^n - 1$ then $m = n + 1$ and the first code is a m-bit code and the second code is a $n = m - 1$ bit code. Then, the logic of this invention requires that each module send only m signals to the other module for comparison and all but $2^{2m-1} - 1$ error syndromes can be detected.

The Q-outputs of parallel latch 36 are treated as a single large binary word designated by parallel bus 38 which is presented to residue generators 44 and 46. Residue generator 44 computes the modulo m residue of input 38 using the method of cascaded carry/save adders, as previously described, to generate the residue code on output lines 48. If, for example, m=63, a 6-bit code is generated. Similarly, residue generator 46 generates the modulo $m - 1$ residue of input 38 and provides it to output lines 50. In this instance, the modulus is 31 and the residue code is a 5-bit code. Thus, to make outputs 48 and 50 of equal width, output 50 is comprised of a "0" in the most significant bit and the residue code in the remaining five bits.

It is important to note that residue codes generated on outputs 48 and 50 will be different for all values of input 38, except those values which are divisible by 1953. Since 1953 is the product of the residue generator moduli, i.e., 63 and 31, 1953 and all of its integer multiples will generate a "0" residue for both residue code generators. Multiplexers 52 and 54 are conditioned by the select line 20 and inverter 56 to select one of the two residue generators 44 or 46. Because the arithmetic module 14 has been selected by forcing a logical "0" on line 20, the A input of multiplexer 54 will be selected while the B input of multiplexer 52 will be selected. This means that the output of the $m - 1$ residue generator 46 will be provided as an output from the master arithmetic module 10, via lines 58, while the output of residue generator 44 will be provided as an input to comparator 60, via lines 62. Multiplexers 64 and 66 of the other arithmetic module 12 are conditioned in a complementary sense in that the select line 22 is forced to a logical "1". This means that the inputs to comparator 60, labeled 62 and 68, are the residue codes from modulo m generators 44 and 70, respectively, while the inputs to comparator 72, namely lines 58 and 74, are the residue codes from the modulo $m - 1$ generators 46 and 76, respectively.

The contents of registers 36 and 86 are checked every cycle and an error detection on module 10 or 12 will result in latches 28 and 80, respectively. If either latch sets, it will suspend further operations in the computer by signalling the fault-handling logic through OR gate 82. The error latches 78 and 80, however, lock up all capturing latches 40, 42, 41, 84, 26 and 86 themselves to guarantee the information is captured for fault isolation procedures.

| CASE 1: | MODULE #1-MOD 63 | MODULE #2-MOD 31 |
|---|---|---|
| ARITH. OUT, BINARY | 000101010101 | 000111010101 |
| ARITH. OUT, DECIMAL | 341 | 469 |
| MOD 63 CODE, BINARY | 011010 | 011100 |
| MOD 63 CODE, DECIMAL | 26 | 28 |
| MOD 31 CODE, BINARY | 00000 | 00100 |
| MOD 31 CODE, DECIMAL | 0 | 4 |
| MISCOMPARE? | YES | YES |

| CASE 2: | MODULE #1-MOD 63 | MODULE #2-MOD 31 |
|---|---|---|
| ARITH. OUT, BINARY | 000101010101 | 000110010100 |
| ARITH. OUT, DECIMAL | 341 | 404 |
| MOD 63 CODE, BINARY | 011010 | 011010 |
| MOD 63 CODE, DECIMAL | 26 | 26 |
| MOD 31 CODE, BINARY | 00000 | 00001 |
| MOD 31 CODE, DECIMAL | 0 | 1 |
| MISCOMPARE? | NO | YES |

| CASE 3: | MODULE #1-MOD 63 | MODULE #2-MOD 31 |
|---|---|---|
| ARITH. OUT, BINARY | 000101010101 | 000111010101 |
| ARITH. OUT, DECIMAL | 341 | 372 |
| MOD 63 CODE, BINARY | 011010 | 011100 |
| MOD 63 CODE, DECIMAL | 26 | 57 |
| MOD 31 CODE, BINARY | 00000 | 00000 |
| MOD 31 CODE, DECIMAL | 0 | 0 |
| MISCOMPARE? | YES | NO |

| CASE 4: | MODULE #1-MOD 63 | MODULE #2-MOD 31 |
|---|---|---|
| ARITH. OUT, BINARY | 000101010101 | 100011110110 |
| ARITH. OUT, DECIMAL | 341 | 2294 |
| MOD 63 CODE, BINARY | 011010 | 011010 |
| MOD 63 CODE, DECIMAL | 26 | 26 |
| MOD 31 CODE, BINARY | 00000 | 00000 |
| MOD 31 CODE, DECIMAL | 0 | 0 |
| MISCOMPARE? | NO | NO |

To aid in understanding the overall operation of the present invention, Table 1 shows four examples or cases. For each case, the first two column entries in the table show an assumed numerical value of operands in the arithmetic logic 14 and 16 in binary notation and decimal notation, respectively, for both the Module #1 10 and the Module #2 12. Recall here that the comparator 60 on the Module #1 compares the modulo 63 results while the comparator 72 on the Module #2 compares the modulo 31 results.

The next two entries in each example in Table I show the binary and decimal values of the modulo 63 residue code generated by devices 44 and 70 on both Modules #1 and #2. Similarly, the next two entries provide the same information for the module 31 residue generators 46 and 76. Finally, the last entry indicates whether Module #1 or Module #2 has detected a miscompare. In case 1, the arithmetic results between Module #1 and Module #2 differ only in the seventh bit position. In this instance, the modulo 63 codes are different, thus, Module #1 detects a miscompare and also the modulo 31 codes are different so that Module #2 also detects a miscompare. A single bit error will always result in a miscompare on both modules. This is because a single bit error will always result in a numerical difference of $2^n$, Since the residue generators are chosen to have a modulus equal $2^m - 1$ and since $2^n$ divided by $2^m - 1$ will never yield an integer value for any value of n or m, the residue is guaranteed to be different.

Case 2 shows an example of a multi-bit error which results in a numeric difference of 63 (decimal) between the value computed by the arithmetic of the Module #1 and that computed by arithmetic logic 16 of Module #2.

In this instance, the modulo 63 code is the same for each, even though the arithmetic results are different. Therefore, Module #1 does not detect a miscompare. However, Module #2 does detect a miscompare.

Case 3 shows an instance in which the arithmetic results differ by a value of 31 (decimal) and, in this instance, Module #2 fails to detect the error however the Module #1 does detect it.

Case 4 shows an example of the rare instance in which a multiple bit error generates identical residue codes for both code generators and the error goes undetected for that particular cycle. This is because the numerical value of the arithmetic outputs differ by an amount equal to the product of the two modulos. Note that in this particular example 50 percent of the bits had to be in error to create this result, a very rare occurrence indeed.

To provide isolation of faults in the residue generator logic 44, 46, 70 and 76, or the selector logic 52, 54, 64 and 66, or comparison logic 60, 72, 78 and 80, it would be possible to also capture the residue codes generated at the outputs of the selectors 52, 54, 64 and 66. A fault in any of this logic would be indicated by one or both error designators being set but when the contents of latches 36 equal to the contents of latches 86 when locked up. To isolate which module 10 or 12 contains the failing checking logic, it would be possible to calculate both residues (mod 63 and 31) and compare them against the captured residues.

There are a number of well-known techniques for collecting and analyzing this information for diagnostic purposes. A preferred method of collecting the diagnostic data is to employ scan/set logic to perform an error logout function. The diagnostic analysis may be performed either off-line by another computer system or on-line in a multi-computer system using known good computing resources.

It is also to be noted that if latches 78 or 80 set, it will lock up the latches 36, 42, 86 and 84 to capture the bits which miscompare. Since the probability is high that both error latches 78 and 80 will set simultaneously, the latches 36 and 42 can be compared against latches 86 and 84 to determine which particular bits were mismatched. This information, along with other captured information, can be used to isolate the failing module. For instance, if the input instruction and operands are captured, it would be possible to emulate the instruction to determine which of the dual modules failed.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Apparatus for detecting and isolating fault conditions within a digital electronic system, comprising:
   (a) a first digital logic array for generating digital output signals in response to digital signal inputs thereto;
   (b) a second digital logic array, identical to said first array, said second array normally receiving as its inputs, the digital signal inputs to said first array and producing digital output signals in response to said digital signal inputs;
   (c) means for operating said first and second arrays in synchrony to normally produce identical digital outputs in the absence of a fault condition occurring in said first array;
   (d) first residue code generating means coupled to receive said digital outputs of said first array;
   (e) second residue code generating means coupled receive said digital outputs of said first array, the modulo of said second residue code generating means being different from the modulo of said first residue code generating means;
   (f) third residue code generating means, identical to said first residue code generating means coupled to receive said digital outputs from said second array;
   (g) fourth residue code generating means, identical to said second residue code generating means coupled to receive said digital outputs from said second array;
   (h) first comparator means coupled to the output of said first and third residue code generating means for detecting inequality between the residue codes issued by said first and third residue code generating means;
   (i) second comparator means coupled to the output of said second and fourth residue code generating means for detecting inequality between the residue codes issued by said second and fourth residue code generating means; and
   (j) combinatorial logic means for providing an output signal indicative of a fault condition when either said first or said second comparator means produces an output indicative of inequality between respective residue codes.

2. The apparatus as in claim 1 and further including selection means disposed between said first, second, third and fourth residue code generating means and said first and second comparator means for selectively coupling any of said first, second, third and fourth residue code generating means to either of said first and second comparator means.

3. The apparatus as in claim 1 wherein the modulo of said residue code generating means each satisfy the condition that $m = 2^n - 1$ where m equals the modulo and n is a positive integer.

* * * * *